March 21, 1939.  J. W. LUTZ  2,151,218
DIESEL ENGINE
Filed Dec. 24, 1936
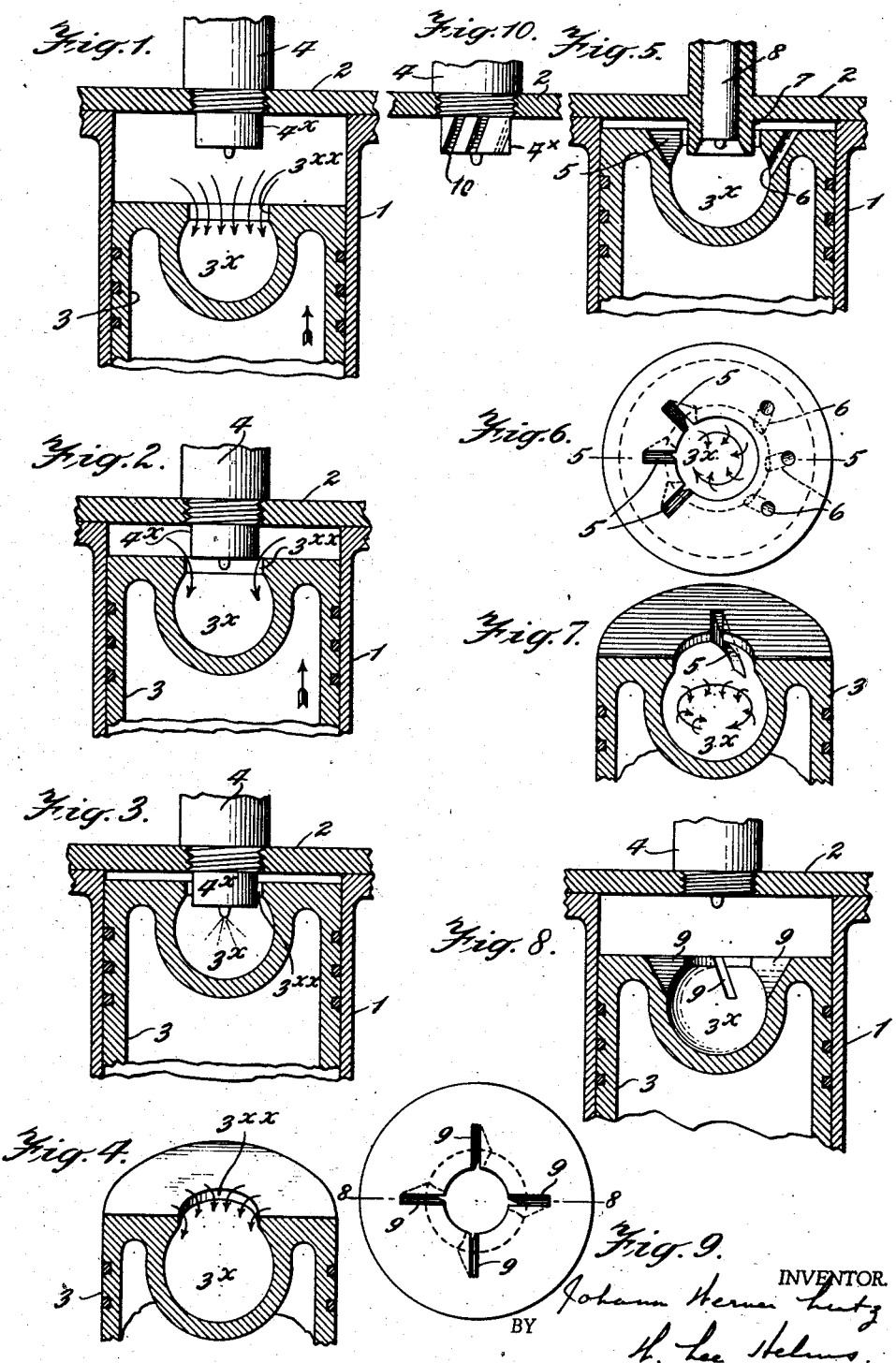

Patented Mar. 21, 1939

2,151,218

UNITED STATES PATENT OFFICE 2,151,218

DIESEL ENGINE

Johann Werner Lutz, Rheineck, Switzerland

Application December 24, 1936, Serial No. 117,602

1 Claim. (Cl. 123—32)

The present invention relates to the combustion chamber and means for effecting turbulency of the air for the combustion by special formations of the piston in which a combustion chamber with a throat is formed, the characteristic of the invention being the provision of means by which a high velocity of air is generated in the throat of the piston combustion chamber section, with attendant turbulency along the throat, as the piston moves toward upper dead center.

In one form of the invention, a member projecting inwardly from the wall closing the top of the engine cylinder is formed and positioned so that as the piston moves toward upper dead center, the said member restricts the throat of the piston combustion chamber section and air is forced through the restricted throat into the piston combustion chamber section, generating a high velocity in the throat with a high degree of turbulency along the throat.

Ports leading from the interior of the piston combustion section to the top of the piston may be employed to generate a turbulency around the combustion chamber axis. In some cases, this will eliminate the necessity of an inwardly projecting member to restrict the throat area of the piston combustion chamber section as hereinafter set forth. The throat restricting member may be formed with one or a plurality of helical straight or otherwise directed slots or bores in order to provide additional turbulency as indicated at 10, Figure 10.

The combustion chamber section, the throat, or any other part of the said chamber, may be constructed as an insert of the piston.

The invention will be described with reference to the accompanying drawing, in which:—

Figure 1 is a vertical section through a cylinder and piston embodying the invention and showing the piston moving in an upward direction.

Figure 2 is a section similar to Figure 1, showing the throat of the piston combustion chamber restricted by means of a member such as an injector nozzle, the piston not having reached final position.

Figure 3 is a view similar to the preceding figure, showing the piston at substantially upper dead center position.

Figure 4 is a perspective view in longitudinal section through the upper portion of the piston illustrated in the preceding figures.

Figure 5 is a view similar to Figure 3, but showing a somewhat modified structure, the structure including turbulence ports leading from the interior of the piston combustion chamber to the top of the piston wall for generating a turbulency around the combustion chamber.

Figure 6 is a top plan view of the piston illustrated in Figure 5, showing by arrows the paths of the turbulence streams generated by the passage of air through the turbulence ports.

Figure 7 is a perspective view in longitudinal section through the upper portion of piston illustrated in Figures 5 and 6.

Figure 8 is a vertical section through a modified structure which eliminates the member shown in the preceding figures, for restricting the throat of the piston combustion chamber section.

Figure 9 is a top plan view of the piston illustrated in Figure 8.

Figure 10 is a view of the throat restricting member provided with slots to generate additional turbulence around the combustion chamber axis.

In Figures 1 to 4 inclusive, I have illustrated a cylinder 1 closed at its top by the cylinder head 2. Within the cylinder is disposed a reciprocatory piston 3 in which is disposed a combustion chamber section 3x having an open throat at 3xx. The combustion chamber section 3x may be spherical, elliptical, or any other suitable shape. Immediately above the throat 3xx and removably held by the cylinder head 2 is a member adapted to restrict the throat as the piston moves toward dead center, said member in the present instance, being an injector nozzle 4 having an extension 4x projecting below the inner surface of cylinder head 2.

In Figure 1 the piston 3 is on its upward stroke and the arrows show that the combustion air is being forced into combustion chamber section 3x.

In Figure 2 the piston in its upward movement has reached such position that throat 3xx is restricted, and in the continued movement of the piston the air is forced through the restricted throat into the combustion chamber section 3x, generating a high velocity in the throat with turbulency of the air along the throat edge. This restricting action of member 4x makes possible the use of a throat area which is large compared with the section of largest area through chamber 3x, taken perpendicular to the chamber axis. This large throat area is very desirable for small size engines where volume of the combustion chamber is small, and it is especially important in high speed engines. The large throat is of almost negligible throttling effect on the incoming air during the greater part of the compression stroke and any material throttling takes place in the latter part of the compression stroke only, when the member 4x continues to restrict the throat area. The duration of such restriction will depend upon the protruding length of member 4x. The throat or the nozzle, or both, may be shaped in any desired way in order to produce any kind of restricting action, as, for example, a gradual restricting action or a constant action.

In addition to the turbulency along the throat edge, a turbulency around the combustion chamber longitudinal axis can be generated, if so desired, by providing the throat with properly disposed ports leading from the interior of member 3x to the top of the piston. As shown in Figures 5 and 6, these ports may be in the form of helically disposed slots at 5, Figures 5 and 6, or holes 6, as shown in said figures, or both.

Part of the air forced into the combustion chamber section 3x will pass through these slots or holes and thereby turbulence will be generated around the longitudinal axis of the combustion chamber as indicated by the arrows in Figures 6 and 7.

In Figure 7 a single helically cut slot is shown.

In Figure 5 the cylinder head has been formed with an integral downwardly projecting combustion chamber restricting member 7 in which the injection nozzle 8 may be held if desired. The action of member 7 will be the same as that of member 4x in the preceding figures.

In some cases the turbulence of the combustion air around the longitudinal axis of the combustion chamber section 3x will be adequate without the necessity of the throat restricting member. In such case the width of the throat may be somewhat reduced over that shown in Figures 1 to 5 inclusive. Such a construction is shown in Figures 8 and 9 in which a plurality of turbulence slots 9 are shown, these slots communicating the area above the piston with the interior of the combustion chamber section 3x in such manner that a whirling turbulence within the combustion chamber is created generally in the manner shown by the arrows in Figure 7.

It will be understood that various modifications may be made in the embodiments of the invention illustrated in the drawing without departing from the spirit of the invention.

What I claim and desire to secure by Letters Patent is as follows:

In Diesel engines, means for creating combustion air turbulence comprising a cylinder and a cylinder closure, a piston having a combustion chamber formed as a surface of revolution in the piston head and having a restricted passageway in communication with the cylinder, said piston head being formed with a radially extending longitudinal slot cut through said piston head from said restricted passageway, said slot being exposed to the space formed between said piston head and said cylinder closure throughout its length and to said combustion chamber throughout its depth, and a projection extending into the cylinder and adapted to enter the restricted passageway of the piston head when the piston is nearing upper dead center position.

JOHANN WERNER LUTZ.